United States Patent
Wang et al.

(10) Patent No.: US 8,037,742 B2
(45) Date of Patent: Oct. 18, 2011

(54) SYSTEMS AND METHODS FOR ENGINE FUEL CONTROL

(75) Inventors: Wenbo Wang, Novi, MI (US); Mark D. Carr, Fenton, MI (US); Michael J. Lucido, Northville, MI (US); Jon C. Miller, Fenton, MI (US); Wajdi B. Hamama, Whitmore Lake, MI (US); Kurt D. Mc Lain, Clarkston, MI (US)

(73) Assignee: GM Global Technology Operations LLC

( * ) Notice: Subject to any disclaimer, the term of this patent is extended or adjusted under 35 U.S.C. 154(b) by 394 days.

(21) Appl. No.: 12/415,051

(22) Filed: Mar. 31, 2009

(65) Prior Publication Data

US 2010/0242582 A1    Sep. 30, 2010

(51) Int. Cl.
   *G01M 15/00*   (2006.01)
(52) U.S. Cl. .................................................. 73/114.62

(58) Field of Classification Search ............... 73/114.58, 73/114.62; 123/406.13
See application file for complete search history.

(56) References Cited

U.S. PATENT DOCUMENTS

| | | | | |
|---|---|---|---|---|
| 5,575,259 A | * | 11/1996 | Fukui et al. | 123/406.47 |
| 6,594,572 B1 | * | 7/2003 | Amendt et al. | 701/48 |
| 7,792,633 B2 | * | 9/2010 | Hamama et al. | 701/114 |
| 2010/0004846 A1 | * | 1/2010 | Hamama et al. | 701/103 |

* cited by examiner

*Primary Examiner* — Freddie Kirkland, III

(57) ABSTRACT

An engine system includes a status determination module and an open-loop fuel control module. The status determination module determines whether a first ignition fuse is in a failure state. The open-loop fuel control module disables a first plurality of fuel injectors and actuates a second plurality of fuel injectors based on a first air/fuel (A/F) ratio when the first ignition fuse is in the failure state, wherein the first ignition fuse and the first plurality of fuel injectors correspond to a first cylinder bank, and wherein a second ignition fuse and the second plurality of fuel injectors correspond to a second cylinder bank.

18 Claims, 4 Drawing Sheets

SYSTEMS AND METHODS FOR ENGINE FUEL CONTROL

FIELD

The present disclosure relates to internal combustion engines and more particularly to fuel control systems in multiple bank engine systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through a throttle and distributed to a plurality of cylinders through an intake manifold of an intake system. Fuel is mixed with the intake air to create an air/fuel (A/F) mixture. The A/F mixture is combusted within cylinders of the engine to generate drive torque. More specifically, combustion reciprocally drives pistons that rotate a crankshaft to provide torque output from the engine.

Fuel is delivered to the cylinders by a fuel system that may include a fuel rail and a plurality of fuel injectors. Combustion within the cylinders is controlled by an ignition system that may include a plurality of ignition coils and a plurality of spark plugs. Exhaust gases are expelled from the cylinders and out of the engine through an exhaust system that may include an exhaust manifold and a catalytic converter.

The engine may include one or more banks of cylinders. An engine with one bank may be referred to as an inline engine because of the straight orientation of its cylinders. In an inline engine, each piston may be attached to a different crankpin on the crankshaft. Each of the plurality of cylinders may include a fuel injector that supplies the cylinder with fuel from a common fuel rail. Additionally, each of the plurality of cylinders may include a spark plug that supplies the cylinder with spark, and an ignition coil that supplies the spark plug with voltage.

An engine with two banks may be referred to as a V-type engine because of the angled orientation of its cylinders. The two banks may be aligned at an acute angle (i.e. less than 90°). For example, a V-6 engine may include two banks of three cylinders each. In a V-type engine, one piston from each cylinder bank may be attached to each crankpin on the crankshaft. In other words, two pistons may be attached to each crankpin.

A V-type engine is typically smaller than an inline engine of similar displacement. However, in V-type engines each ignition coil in the cylinder bank may share a common ignition fuse that is different from one or more fuses associated with the fuel injectors in the cylinder bank. Therefore, when the ignition fuse of a cylinder bank fails, the corresponding fuel injectors (operating on a different fuse) may continue injecting fuel. The injecting of fuel into cylinders that include inoperable ignition coils due to the failed ignition fuse may result in decreased performance, increased emissions, and/or damage to engine system components such as the catalytic converter.

SUMMARY

An engine system includes a status determination module and an open-loop fuel control module. The status determination module determines whether a first ignition fuse is in a failure state. The open-loop fuel control module disables a first plurality of fuel injectors and actuates a second plurality of fuel injectors based on a first air/fuel (A/F) ratio when the first ignition fuse is in the failure state, wherein the first ignition fuse and the first plurality of fuel injectors correspond to a first cylinder bank, and wherein a second ignition fuse and the second plurality of fuel injectors correspond to a second cylinder bank.

A method includes determining whether a first ignition fuse is in a failure state, and disabling a first plurality of fuel injectors and actuating a second plurality of fuel injectors based on a first air/fuel (A/F) ratio when the first ignition fuse is in the failure state, wherein the first ignition fuse and the first plurality of fuel injectors correspond to a first cylinder bank, and wherein a second ignition fuse and the second plurality of fuel injectors correspond to a second cylinder bank.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
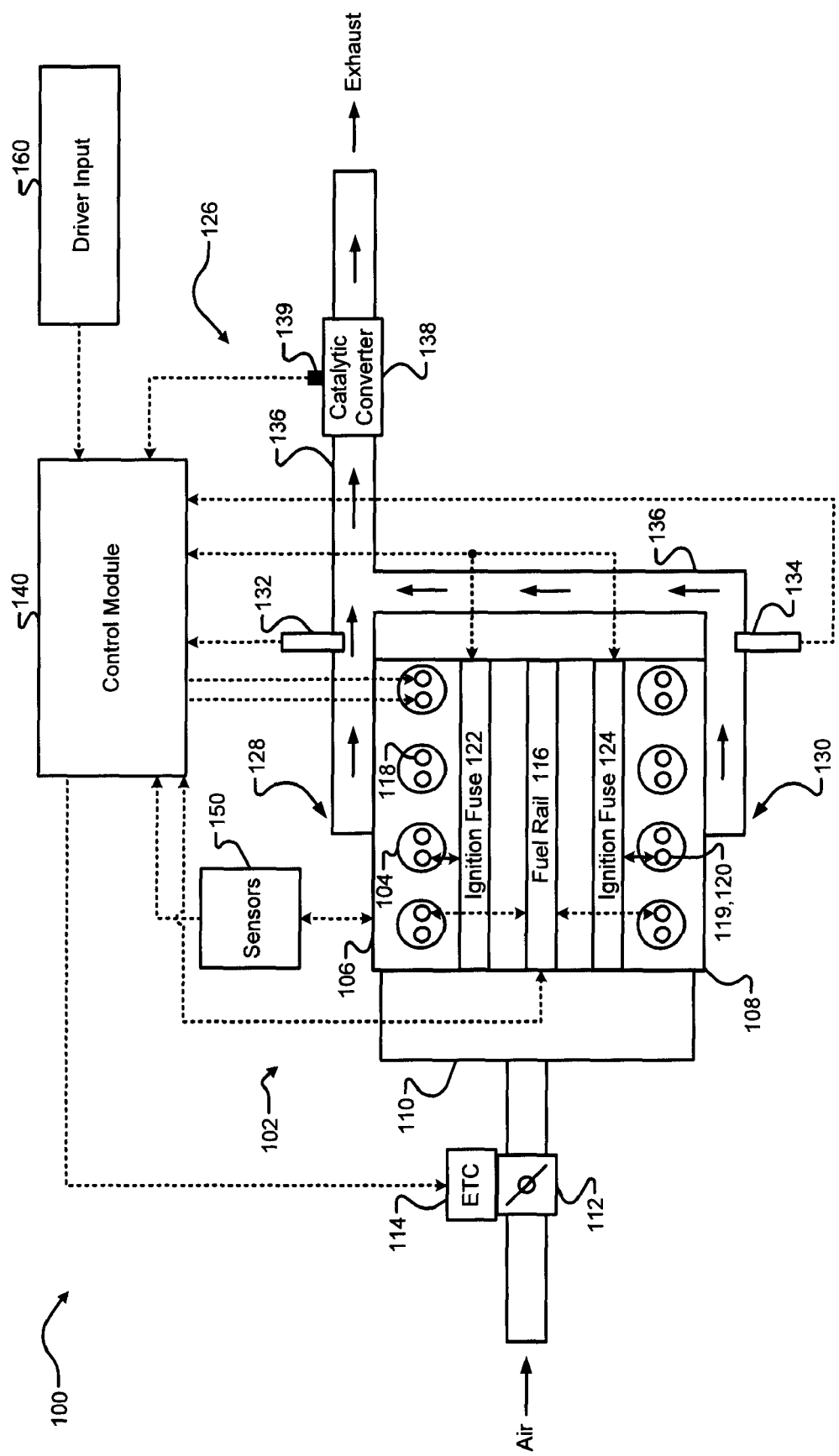
FIG. 1 is a functional block diagram of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 100 is shown. The engine system 100 includes a direct fuel injection engine 102. For example, the engine 102 may be a spark-ignition, direct-injection (SIDI) engine. A plurality of cylinders 104 of the engine 102 may be configured in a V-type configuration. For example, the engine 102 may include eight cylinders 104 as shown, although the engine 102 may include a greater or lesser number of cylinders 104. The cylinders 104 of the engine 102 are depicted as being arranged in two cylinder banks 106, 108.

Air is drawn into the engine 102 through an intake manifold 110 and a throttle valve 112. The throttle valve 112 is actuated to control airflow into the engine 102. For example, an electronic throttle controller (ETC) 114 may control the throttle valve 112 and, therefore, airflow into the engine 102.

A fuel rail 116 supplies the cylinders 104 with fuel from a fuel tank (not shown) that mixes with the air to form the air and fuel (A/F) mixture. While one fuel rail 116 is shown, the engine system 102 may include one fuel rail for each engine bank 106, 108. A plurality of fuel injectors 118 supplies the cylinders 104 with fuel from the fuel rail 116.

The A/F mixture is combusted within the cylinders 104 of the engine 102. Combustion may be initiated by a plurality of ignition coils 119 and a plurality of spark plugs 120. In other words, voltage may be supplied to each spark plug 120 by a corresponding ignition coil 119. More specifically, each ignition coil 119 may receive a voltage (e.g. 12V) from a battery (not shown) and transform the voltage into a higher voltage required to spark a corresponding spark plug 120. Furthermore, ignition fuses 122, 124 may be connected in series with the battery (not shown) and each of the ignition coils 119. More specifically, each of the ignition fuses 122, 124 may correspond to one of the banks of cylinders 106, 108, and thus each of the ignition fuses 122, 124 may correspond to half of the cylinders 104 and half of the corresponding ignition coils 119.

Exhaust gas resulting from combustion of the A/F mixture is expelled from the engine 102 to an exhaust system 126. More specifically, exhaust expelled from each of the cylinders 104 of cylinder bank 106 converges at confluence point 128. Similarly, exhaust gas expelled from each of the cylinders 104 of cylinder bank 108 converges at confluence point 130.

The cylinder banks 106, 108 each have an associated oxygen sensor that measures oxygen concentration of the exhaust gas produced by the cylinders 104 of that cylinder bank. For example, oxygen sensor 132 may be associated with cylinder bank 106 and oxygen sensor 134 may be associated with cylinder bank 108. The oxygen sensors 132, 134 output signals corresponding to oxygen in the exhaust produced by the cylinders 104 of the cylinder banks 106, 108, respectively.

Oxygen sensor 132 may be located at any suitable location, such as at or downstream of confluence point 128. Similarly, oxygen sensor 134 may also be located at any suitable location, such as at or downstream of confluence point 130. The oxygen sensors 132 and 134 may be any suitable type of oxygen sensor, such as wide-band type oxygen sensors. The signals output by the oxygen sensors 132 and 134 may be any suitable type of signal, such as analog voltage signals.

The exhaust gas flows past the oxygen sensors 132, 134 and the exhaust may be brought together by a system of exhaust pipes 136, which carry the exhaust to a catalytic converter 138. While a Y-type exhaust system 126 is shown, it can be appreciated that other exhaust system configurations may be implemented. For example, a dual exhaust system may be implemented such that the exhaust is not brought together by the system of exhaust pipes 136. In other words, in a V-type engine, each cylinder bank may have one independent exhaust pipe and one independent catalytic converter. Thus, for example, cylinder bank 106 may have an exhaust pipe and catalytic converter and cylinder bank 108 may have a different exhaust pipe and a different catalytic converter. For example, the two separate sets of exhaust pipes may be in parallel to each other.

The catalytic converter 138 selectively reacts with various components of the exhaust before the exhaust is expelled from the exhaust system 126. The oxygen sensors 132, 134 are located upstream of the catalytic converter 138. In one embodiment, a catalyst temperature sensor 139 measures a temperature of the catalyst in the catalytic converter 138 and communicates the catalyst temperature ($T_{CAT}$) to a control module 140. Alternatively, the catalyst temperature $T_{CAT}$ may be modeled by the control module 140 based on other parameters.

The control module 140 controls operation of the engine system 100, and more specifically torque output of the engine 102. The control module 140 may control the torque output of the engine 102 based on input from sensors 150. The sensors 150 generate signals based on operating conditions of the engine, such as engine temperature and engine speed (i.e. crankshaft revolutions per minute, or RPM). The control module 140 may also control torque output of the engine 102 based on driver input 160, such as position of an accelerator pedal.

The control module 140 may control torque output by controlling the A/F mixture. More specifically, the control module 140 may control air, fuel, and/or spark provided to each of the cylinders 104. For example, the control module 140 may control air with the throttle valve 112, fuel with the fuel rail 116 and the fuel injectors 118, and/or spark with the ignition coils 119 and the spark plugs 120. In one embodiment, the control module 140 may control the A/F mixture to achieve a stoichiometric A/F mixture (i.e. 14.7:1). The control module 140 may also control the A/F mixture in response to inputs received from the sensors 150 and/or the driver input 160. For example, when driver input 160 corresponds to torque above a predetermined threshold, the control module 140 may richen the A/F mixture. In other words, the control module 140 may include a plurality of A/F ratios. For example, the plurality of A/F ratios may include an A/F ratio for efficiency and an A/F ratio for power.

In one embodiment, the control module 140 may control the A/F mixture in one of three modes: closed-loop fuel control (i.e. default) mode, catalytic temperature protection mode, and open-loop fuel control mode. Closed-loop fuel control mode includes controlling fuel injection based on feedback from the oxygen sensors 132, 134. Open-loop fuel control mode includes controlling fuel injection without feedback. For example, open-loop fuel control mode may include controlling fuel injection based on one of a plurality of A/F ratios. Catalytic temperature protection mode includes controlling fuel injection to control temperature of the catalytic converter 138. For example, catalytic temperature protection mode may include decreasing the A/F ratio (enriching the A/F mixture) when the temperature of the catalytic converter 138 is greater than a predetermined threshold.

Figure 2:
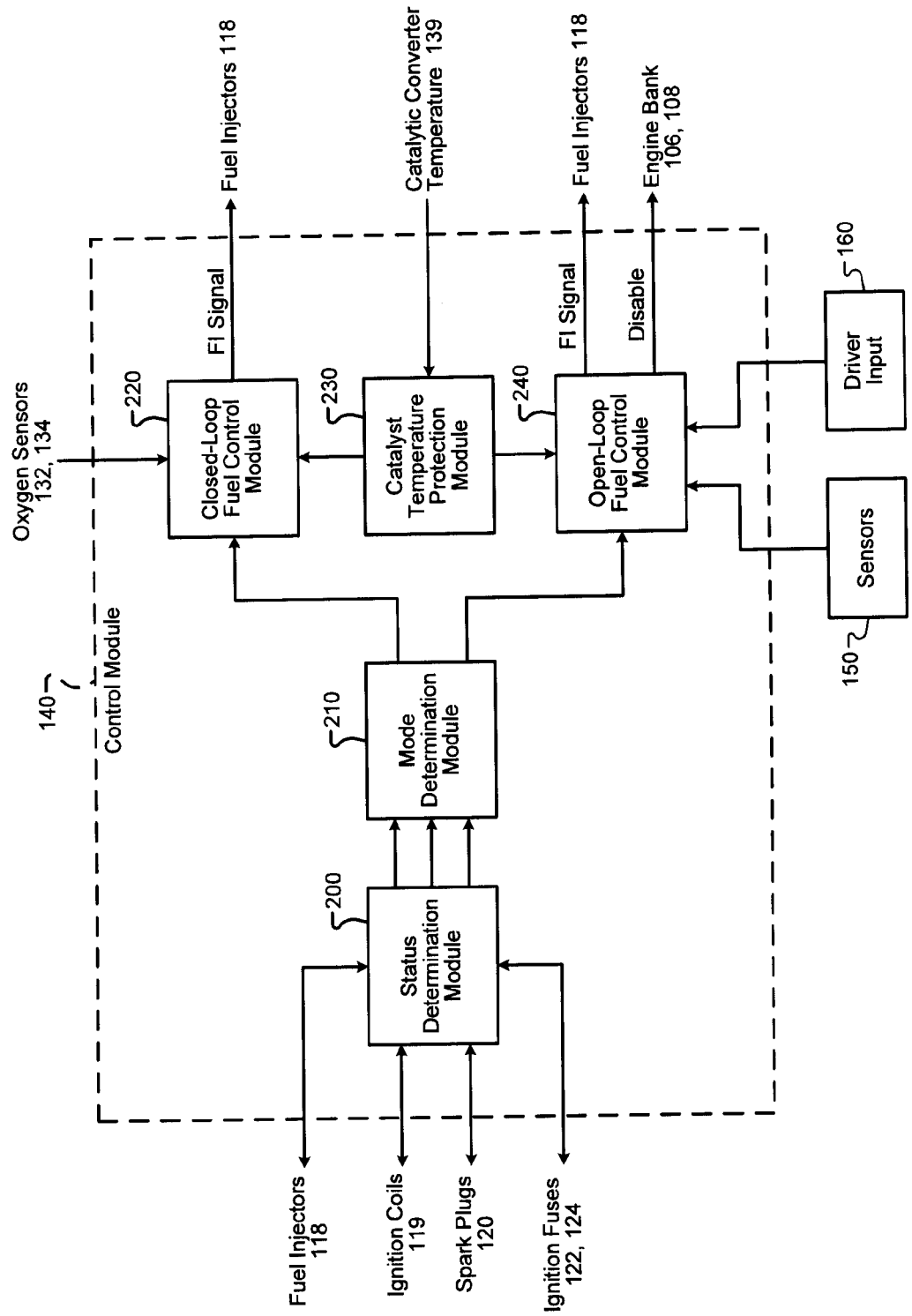
FIG. 2 a functional block diagram of a control module according to the present disclosure.

Referring now to FIG. 2, the control module 140 is shown. The control module 140 may include a status determination module 200, a mode determination module 210, a closed-loop fuel control module 220, a catalyst temperature protection module 230, and an open-loop fuel control module 240.

The status determination module 200 may communicate with the fuel injectors 118, the ignition coils 119, the spark plugs 120, and/or the ignition fuses 122, 124. The status determination module 200 may determine when one of the fuel injectors 118, the ignition coils 119, the spark plugs 120, and/or the ignition fuses 122, 124 is in a failure state. For example only, the failure state for one of the fuel injectors 118 may correspond to a clogged injector line or an open-circuit. Additionally, for example only, the failure state for one of the ignition coils 119 and/or the spark plugs 120 may correspond to an open-circuit. Furthermore, for example only, the failure state for one of the ignition fuses 122, 124 may correspond to a blown fuse.

The mode determination module 210 may receive the statuses of the fuel injectors 118, the ignition coils 119, the spark plugs 120, and the ignition fuses 122, 124. The mode determination module 210 may determine a fuel control mode based on the received statuses of the fuel injectors 118, the ignition coils 119, the spark plugs 120, and/or the ignition fuses 122, 124. More specifically, the mode determination module 210 may enable one of the closed-loop fuel control module 220 and the open-loop fuel control module 240 based on the received statuses.

The catalyst temperature protection module 230 may communicate with both the closed-loop fuel control module 220 and the open-loop fuel control module 240. The catalyst temperature protection module 230 may be activated by the catalyst temperature $T_{CAT}$. In other words, for example, when the catalyst temperature $T_{CAT}$ is greater than a predetermined temperature threshold the catalyst temperature protection module 230 may command the closed-loop fuel control module 220 or the open-loop fuel control module 240 to enrich the A/F ratio to prevent overheating (i.e. reduce temperature) of the catalytic converter 138.

For example only, the mode determination module 210 may enable the closed-loop fuel control module 220 when none of the fuel injectors 118, the ignition coils 119, the spark plugs 120, and the ignition fuses 122, 124 are in a failure state. In other words, the closed-loop fuel control module 220 (i.e. closed-loop fuel control mode) may be a default mode.

The closed-loop fuel control module 220 receives the feedback signals from oxygen sensors 132, 134 in the exhaust stream. The closed-loop fuel control module 220 may generate fuel injector (FI) control signals based on the feedback signals from oxygen sensors 132, 134 and a predetermined A/F ratio. For example only, the predetermined A/F ratio may be 14.7:1 (i.e. stoichiometric). Additionally, for example only, the closed-loop fuel control module 220 may increase fuel injection (i.e. enrich the A/F ratio) when oxygen levels are higher than a predetermined threshold. However, as previously mentioned, the catalyst temperature protection module 230 may command the closed-loop fuel control module 220 to operate with an enriched A/F ratio when the catalyst temperature $T_{CAT}$ is greater than the predetermined threshold. For example only, the catalyst temperature protection module 230 may command a richer A/F ratio than is currently being commanded to cool the temperature of the catalyst $T_{CAT}$ in the catalytic converter 138.

Alternatively, for example only, the mode determination module 210 may enable the open-loop fuel control module 240 when one of the fuel injectors 118, the ignition coils 119, the spark plugs 120, and the ignition fuses 122, 124 is in the failure state. However, different A/F ratios may be commanded based on which of the fuel injectors 118, the ignition coils 119, the spark plugs 120, and the ignition fuses 122, 124 are in the failure state.

First, the open-loop fuel control module 240 may command a first A/F ratio when one of the ignition fuses 122, 124 is in the failure state. The open-loop fuel control module 240 may also disable the fuel injectors 118 corresponding to the one of the cylinder banks 106, 108 that includes the failed ignition fuse. In other words, the open-loop fuel control module 240 may generate fuel injector (FI) control signals based on the first A/F ratio for the fuel injectors 118 corresponding to the one of the cylinder banks 106, 108 without the failed ignition fuse. For example only, the first A/F ratio may be 14.7:1 (i.e. stoichiometric). Alternatively, for example only, the first A/F ratio may be based on engine speed 150 and/or driver input 160 via accelerator pedal position. In other words, the first A/F ratio may be based on achieving power and/or emissions requirements using only one of the cylinder banks 106, 108 and thus only half of the cylinders 104.

Second, the open-loop fuel control module 240 may command a second A/F ratio when one of the ignition coils 119 and the spark plugs 120 is in the failure state. More specifically, the open-loop fuel control module 240 may generate FI control signals based on the second A/F ratio. For example only, the second A/F ratio may be richer than stoichiometric (e.g. less than 14.7:1) and may be a function of a number of failed ignition coils 119 or failed spark plugs 120.

Third, the open-loop fuel control module 240 may command a third A/F ratio when one of the fuel injectors 118 is in the failure state. The open-loop fuel control module 240 may also disable the fuel injector 118 that is in the failure state. For example, disabling the fuel injector 118 that is in the failure state may prevent fuel from being injected by the fuel injector 118 due to a short or an open-circuit.

In other words, the open-loop fuel control module 240 may generate FI control signals based on the third A/F ratio for the fuel injectors 118 that are not in the failure state. For example only, the third A/F ratio may be 14.7:1 (i.e. stoichiometric). Alternatively, for example only, the third A/F ratio may be a function of a number of failed fuel injectors 118.

Figure 3:
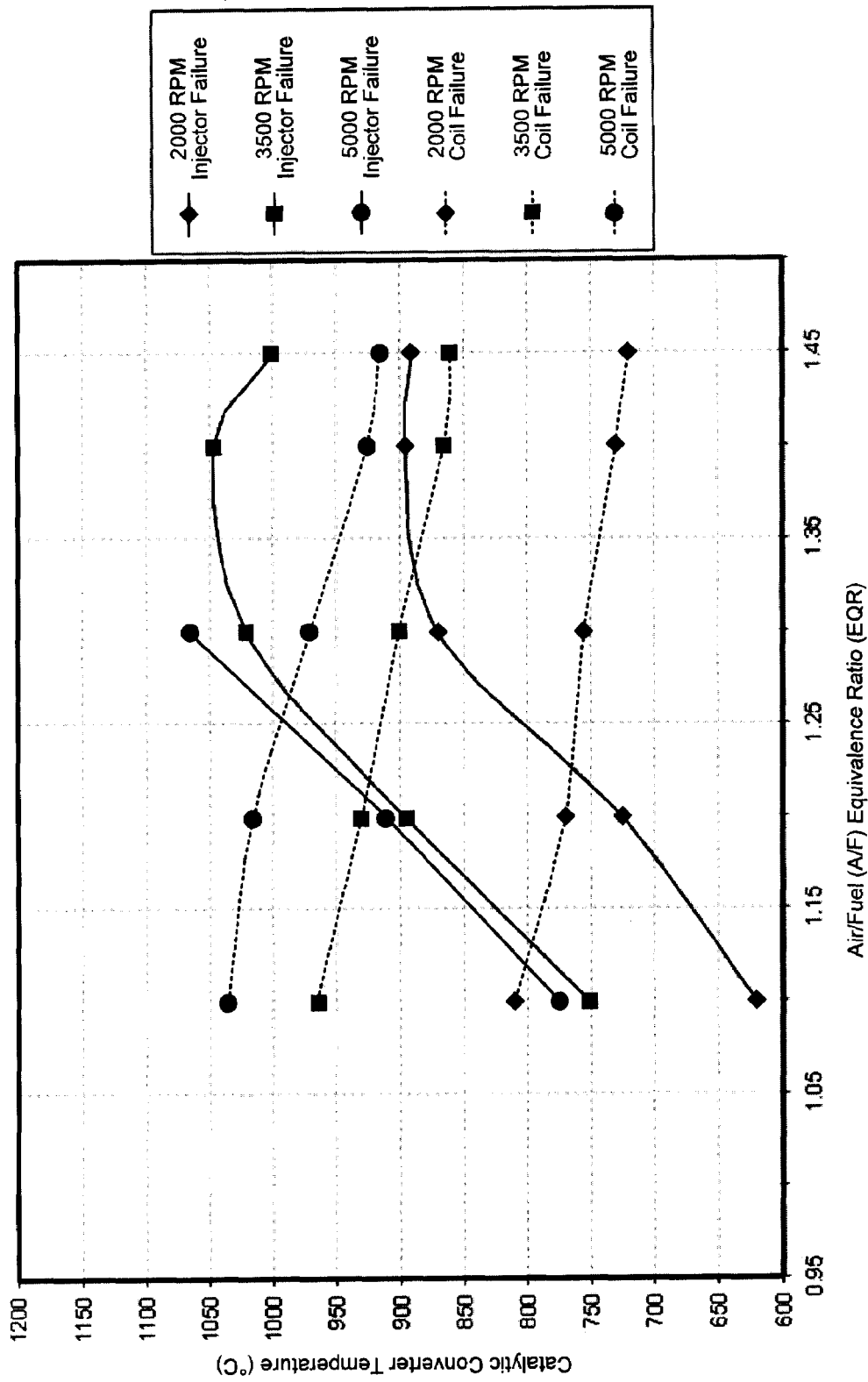
FIG. 3 is a graph illustrating the relationship between air-to-fuel (A/F) ratio and catalytic converter temperature during fuel injector and ignition coil failures.

Referring now to FIG. 3, a graph illustrating temperature of the catalytic converter 138 and A/F equivalence ratio (EQR) when one of the fuel injectors 118 is in the failure state and when one of the ignition coils 119 or spark plugs 120 is in the failure state. For example, the A/F EQR may be a stoichiometric A/F ratio (14.7:1) divided by the current A/F ratio.

When one of the fuel injectors 118 is in the failure state, decreasing the A/F EQR to near 1.00 (i.e. A/F ratio near 14.7:1) may decrease temperature of the catalytic converter 138. For example, the A/F EQR near 1.00 (A/F ratio near 14.7:1) may correspond to the third A/F ratio (i.e. stoichiometric). Additionally, the A/F EQR near 1.00 may correspond to the first A/F ratio (i.e. ignition fuse failure).

Conversely, when one of the ignition coils 119 or the spark plugs 120 is in the failure state, increasing the A/F EQR above 1.00 (i.e. decreasing A/F ratio below 14.7:1) may decrease temperature of the catalytic converter 138. For example, the A/F EQR above 1.00 (e.g. 1.45, or an A/F ratio of 10.1:1) may correspond to the second A/F ratio (i.e. rich).

Therefore, in general, leaning the A/F mixture (towards stoichiometric) when one of the fuel injectors 118 is in the failure state and enriching the A/F mixture (above stoichiometric) when one of the ignition coils 119 or the spark plugs 120 is in the failure state may increase performance and/or prevent damage to the catalytic converter 138. Additionally, in general, leaning the A/F mixture (towards stoichiometric) when one of the ignition fuses 122, 124 is in the failure state may increase performance and/or prevent damage to the catalytic converter 138.

More specifically, the excessive temperatures of the catalytic converter 138 may decrease exhaust catalyzation efficiency and/or damage the catalytic converter 138. For example only, when the catalytic converter is heated to a temperature over 850° C., a catalyst in the catalytic converter 138 may be aged or damaged irreversibly.

Figure 4:
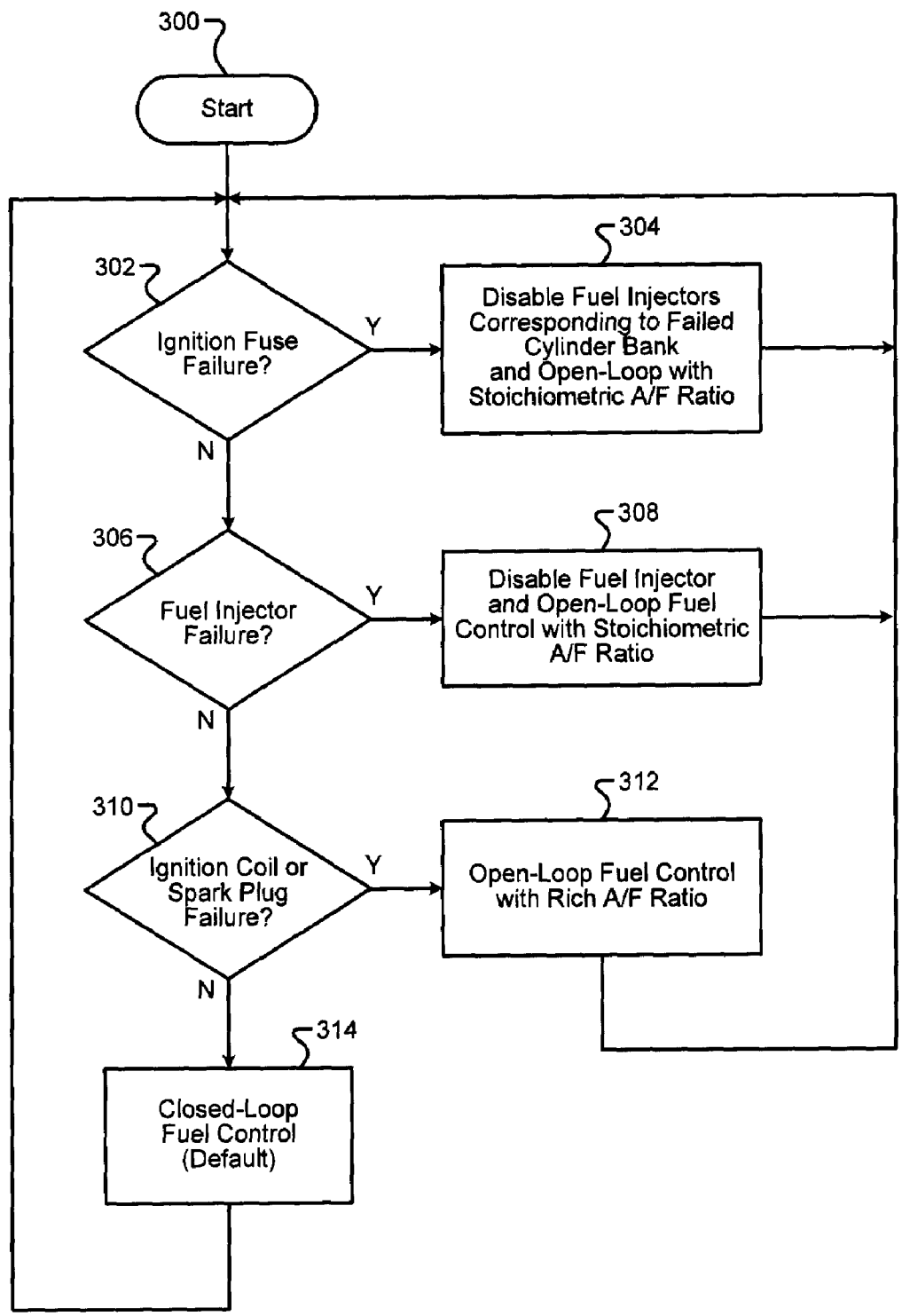
FIG. 4 is a flow diagram illustrating steps performed by the control module according to the present disclosure.

Referring now to FIG. 4, a flow diagram illustrating a method of operating the engine system 100 (i.e. determining fuel control modes) begins in step 300. In step 302, the control module 140 determines whether one of the ignition fuses 122, 124 is in the failure state. If true, control may proceed to step 304. If false, control may proceed to step 306.

In step 304, the control module 140 disables fuel injectors 118 corresponding to the one of the cylinder banks 106, 108 that includes the failed ignition fuse. Additionally, the control module 140 enables open-loop fuel control mode with the first A/F ratio (i.e. stoichiometric). Control may then return to step 302.

In step 306, the control module 140 determines whether one of the fuel injectors 118 is in the failure state. If true, control may proceed to step 308. If false, control may proceed to step 310. In step 308, the control module 140 may disable the fuel injector that is in the failure state and then may enable open-loop fuel control mode with the third A/F ratio (i.e. stoichiometric). Control may then return to step 302.

In step 310, the control module 140 determines whether one of the ignition coils 119 or the spark plugs 120 is in the failure state. If true, control may proceed to step 312. If false, control may proceed to step 314. In step 312, the control module 140 may enable open-loop fuel control mode with the second A/F ratio (i.e. rich). Control may then return to step 302.

In step 314, the control module 140 may enable closed-loop fuel control mode (i.e. default mode), and control may return to step 302.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system, comprising:
   a status determination module that determines whether a first ignition fuse is in a failure state; and
   an open-loop fuel control module that disables a first plurality of fuel injectors and actuates a second plurality of fuel injectors based on a first air/fuel (A/F) ratio when the first ignition fuse is in the failure state,
   wherein the first ignition fuse and the first plurality of fuel injectors correspond to a first cylinder bank, and wherein a second ignition fuse and the second plurality of fuel injectors correspond to a second cylinder bank.

2. The engine system of claim 1, wherein the first A/F ratio is one of stoichiometric and based on at least one of an engine load, an engine speed, and an engine temperature.

3. The engine system of claim 1, wherein the status determination module determines when one a first plurality of ignition coils, a first plurality of spark plugs, a second plurality of ignition coils, and a second plurality of spark plugs is in the failure state,
   wherein the first plurality of ignition coils and the first plurality of spark plugs correspond to the first cylinder bank, and wherein the second plurality of ignition coils and the second plurality of spark plugs correspond to the second cylinder bank.

4. The engine system of claim 3, wherein the open-loop fuel control module actuates the first and second pluralities of fuel injectors based on a second A/F ratio when one of the first and second pluralities of ignition coils and the first and second pluralities of spark plugs is in the failure state.

5. The engine system of claim 4, wherein the second A/F ratio is one of richer than stoichiometric and based on a number of the first and second pluralities of ignition coils and the first and second pluralities of spark plugs that are in the failure state.

6. The engine system of claim 1, wherein the status determination module determines whether one of the first and second pluralities of fuel injectors is in the failure state.

7. The engine system of claim 6, wherein the open-loop fuel control module actuates the first and second pluralities of fuel injectors based on a third A/F ratio when one of first and second pluralities of fuel injectors is in the failure state.

8. The engine system of claim 7, wherein the third A/F ratio is one of stoichiometric and based on a number of the first and second pluralities of fuel injectors that are in the failure state.

9. The engine system of claim 3, further comprising:
   a closed-loop fuel control module that actuates the first and second pluralities of fuel injectors based on a predetermined A/F ratio and an oxygen level in an exhaust stream when none of the first and second ignition coils, the first and second pluralities of fuel injectors, the first and second pluralities of ignition coils, and the first and second pluralities of spark plugs are in the failure state.

10. A method, comprising:
    determining whether a first ignition fuse is in a failure state; and
    disabling a first plurality of fuel injectors and actuating a second plurality of fuel injectors based on a first air/fuel (A/F) ratio when the first ignition fuse is in the failure state,
    wherein the first ignition fuse and the first plurality of fuel injectors correspond to a first cylinder bank, and wherein a second ignition fuse and the second plurality of fuel injectors correspond to a second cylinder bank.

11. The method of claim 10, wherein the first A/F ratio is one of stoichiometric and based on at least one of an engine load, an engine speed, and an engine temperature.

12. The method of claim 10, further comprising:
    determining when one a first plurality of ignition coils, a first plurality of spark plugs, a second plurality of ignition coils, and a second plurality of spark plugs is in the failure state,
    wherein the first plurality of ignition coils and the first plurality of spark plugs correspond to the first cylinder bank, and wherein the second plurality of ignition coils and the second plurality of spark plugs correspond to the second cylinder bank.

13. The method of claim 12, further comprising:
    actuating the first and second pluralities of fuel injectors based on a second A/F ratio when one of the first and second pluralities of ignition coils and the first and second pluralities of spark plugs is in the failure state.

14. The method of claim 13, wherein the second A/F ratio is one of richer than stoichiometric and based on a number of the first and second pluralities of ignition coils and the first and second pluralities of spark plugs that are in the failure state.

15. The method of claim 10, further comprising:
    determining whether one of the first and second pluralities of fuel injectors is in the failure state.

16. The method of claim 15, further comprising:
    actuating the first and second pluralities of fuel injectors based on a third A/F ratio when one of first and second pluralities of fuel injectors is in the failure state.

17. The method of claim 16, wherein the third A/F ratio is one of stoichiometric and based on a number of the first and second pluralities of fuel injectors that are in the failure state.

18. The method of claim 12, further comprising:
    actuating the first and second pluralities of fuel injectors based on a predetermined A/F ratio and an oxygen level in an exhaust stream when none of the first and second ignition coils, the first and second pluralities of fuel injectors, the first and second pluralities of ignition coils, and the first and second pluralities of spark plugs are in the failure state.

* * * * *